United States Patent [19]

Inman et al.

[11] 4,426,038

[45] Jan. 17, 1984

[54] NON-RADIATING EXTENDIBLE CLOTH EXIT CONE FOR ROCKET NOZZLES

[75] Inventors: Frank S. Inman; Joseph E. Pelham, both of Brigham City, Utah

[73] Assignee: Thiokol Corporation, Chicago, Ill.

[21] Appl. No.: 338,713

[22] Filed: Jan. 11, 1982

[51] Int. Cl.³ .............................................. B64D 33/04
[52] U.S. Cl. .................................. 239/265.15; 60/271; 60/200.1; 239/265.43; 239/DIG. 19
[58] Field of Search ..................... 239/265.11, 265.15, 239/265.19, 265.33, 265.43, DIG. 19; 60/271, 200 A

[56] References Cited

U.S. PATENT DOCUMENTS

| | | | |
|---|---|---|---|
| 3,358,933 | 12/1967 | Altseimer | 239/265.43 |
| 3,482,783 | 12/1969 | Nebiker et al. | 239/265.43 X |
| 3,596,465 | 8/1971 | Paine | 239/265.19 X |
| 3,648,461 | 3/1972 | Bailey et al. | 60/271 |
| 3,711,027 | 1/1973 | Carey | 239/265.43 X |
| 3,784,109 | 1/1974 | Dueringer | 239/265.43 X |
| 3,933,310 | 1/1976 | Hickox | 239/265.43 |
| 3,957,206 | 5/1976 | Mason | 60/271 X |
| 4,162,040 | 7/1979 | Carey | 239/265.33 |

FOREIGN PATENT DOCUMENTS 1357065  2/1963  France ......................... 239/265.15

Primary Examiner—Andres Kashnikow
Assistant Examiner—Michael J. Forman
Attorney, Agent, or Firm—Gerald K. White

[57] ABSTRACT

A non-radiating cloth exit cone for a rocket nozzle includes a flared woven refractory cloth structure having the shape of the frustum of a cone with a refractory felt sewn to the exterior surface of the cloth structure for thermal insulation of the cloth structure and a sacrificial ablative material comprising tufts of refractory material incorporated in the interior surface of the cloth structure, the cloth structure providing the primary supporting structure for transmitting the rocket motor thrust forces to the rocket nozzle.

14 Claims, 4 Drawing Figures

NON-RADIATING EXTENDIBLE CLOTH EXIT CONE FOR ROCKET NOZZLES

BACKGROUND OF THE INVENTION

1. Field of the Invention

This invention relates to an improvement in rocket nozzles, and more particularly, to a non-radiating plural position flexible auxiliary nozzle portion or exit cone for a rocket motor.

2. Description of the Prior Art

Deep space ballistic missile systems or satellite probes require high performance, low weight, and highly packageable primary propulsion systems. Excluding propellant tanks, the largest component of a propulsion system is the rocket exhaust nozzle. The rocket nozzle takes up a great deal of valuable space relative to its mass.

Conventional thrust nozzle exit cones for rocket motor ballistic systems are designed to provide the best average performance over the whole intended trajectory within the volumetric constraints created by launch tube clearance and interstage length limitations. One of the functions of the exit cone of a rocket nozzle is to provide an inclined surface against which the expanding exhaust plume of the rocket can bear, thereby providing some of the forward thrust of the rocket. The exhaust plume grows larger with increasing altitude of the rocket because of the decreasing pressure of the ambient atmosphere. As a result, in a conventional rocket nozzle, the exhaust plume at low altitudes is too small for the available surface of the exit cone. This allows the formation, inside the edges of the exit cone, of a partial vacuum which creates an atmospheric drag on the rocket. At high altitudes the exhaust plume is too large for the exit cone, and as a result, much of the potential energy is unused. A rocket nozzle that is sufficiently large to make full use of the expanding exhaust gases of a rocket in the low ambient pressures at high altitudes would normally occupy an inordinately large proportion of the available storage space in silos, submarines, aircraft, or between stages of a multistage missile.

Various proposals have been made in the prior art to provide a large expansion ratio nozzle that can be stowed in a collapsed or retracted configuration and thus made to fit into a minimal storage space, and that can be extended to the operating position after motor ignition. These have included the use of: an inflatable auxiliary rocket nozzle portion or exit cone as disclosed in U.S. Pat. No. 3,596,465 to Thomas O. Paine et al; rocket nozzle exit cones that are flexible and can be expanded or compressed in various ways as disclosed in said Paine et al patent, and in U.S. Pat. No. 3,358,933 to J. H. Altseimer, U.S. Pat. No. 3,711,027 to Lee F. Carey, and U.S. Pat. No. 3,784,109 to John W. Dueringer; and rocket nozzle exit cones that are segmented longitudinally as disclosed in a paper entitled "Nested Extendible Exit Cone Solid Rocket Nozzle Engineering Evaluation Program" presented at the AIAA/SAE 14th Joint Propulsion Conference, Las Vegas, Nev., July 25-27, 1978, and as disclosed in copending application for U.S. Patent bearing Ser. No. 230,939, filed on Feb. 12, 1981 by Frank S. Inman, one of the present inventors, and assigned to Thiokol Corporation, the assignee of the present invention.

In FIGS. 1-4 of the Altseimer patent a rocket nozzle skirt is provided that is expandable transversely of the rocket motor longitudinal axis, the skirt being said to be made of metallic or non-metallic material, but not being foldable. In FIG. 5 a foldable flared skirt is provided. This skirt is said to be made of material such as reinforced rubber produced under the trademark GENGARD by the General Tire and Rubber Company or asbestos reinforced with inconel wire and impregnated with an ablative material such as Teflon.

The paine et al patent shows a skirt for a rocket engine that is made of a three-dimensional metal fabric. The outer surface of the metal fabric is said to be sealed with a silicon elastomer, and the fabric is described as being cooled by exhaust gas from a main rocket turbine.

In the specification of the Paine et al patent, mention is made of extendible nozzle skirts having been developed in the prior art using an elastomeric ablator supported by a woven textile fabric, the patentees noting further that due to the thickness of the ablator required for cooling the textile fabric and for resisting the temperature and erosion of the exhaust gases, the ablator becomes extremely heavy and this offsets any gains in engine performance.

The Carey and Dueringer patents disclose related subject matter, the material of the foldable rocket nozzle extension of the Carey patent being described as sheet metal but that of the Dueringer patent not being mentioned.

An additional requirement for deep space satellite probes is that thermally sensitive gear, for example, reaction control system hardware, radioactive thermal generator batteries, data recorders, and navigational equipment be protected from the rocket nozzle external surface radiation during its operation.

While the prior art proposals mentioned above are concerned with the problem of how to make the auxiliary nozzle portion or exit cone of a rocket nozzle more compact so as to fit in a minimal storage space, none of them have disclosed, or otherwise taught or considered, how to make the rocket nozzle cone collapsible or retractable, and, at the same time, shown how to insulate it to make its external surface non-radiating while maintaining its flexibility. The metallic exit cones proposed in the prior art do not have the required non-radiating surface characteristics, nor do the prior art exit cones made of an elastomeric ablator supported by a woven, textile fabric, the reinforced rubber, or the wire reinforced asbestos sheet impregnated with Teflon.

SUMMARY OF THE INVENTION

An object of the invention is to provide a collapsible non-radiating, auxiliary rocket nozzle portion or exit cone that has adequate flexibility and the insulation properties needed to prevent external surface radiation.

Another object of the invention is to provide such an exit cone for rocket nozzles that is light in weight.

A further object of the invention is to provide such an exit cone for rocket nozzles wherein woven refractory cloth is employed as the primary structure that transmits the thrust forces to the fixed nozzle.

Still another object of the invention is to provide such an exit cone for rocket nozzles that is constructed of refractory felt sewn to a densely woven refractory cloth.

A further object of the invention is to provide such an exit cone for rocket nozzles wherein refractory tufts are incorporated in the woven refractory cloth for providing thermal erosion protection, the tufts acting as a sacrificial ablative material.

In accomplishing these and other objectives of the invention there is provided an auxiliary nozzle portion or exit cone for a rocket nozzle that is foldable upon itself over the rocket nozzle while in storage but which is extendible, and when fully deployed aft of the nozzle, comprises an extension of progressively greater diameter, that is, a flared skirt of frustoconical shape. The exit cone is constructed of a refractory felt sewn to a densely woven refractory cloth. The woven cloth acts as a primary structure that transmits the thrust forces to the fixed nozzle of a rocket motor. Multiple-plane or double cloth weaving methods may be emloyed in manufacturing the cloth. For example, the cloth may be woven in two layers which may be united by a separate binding weft. Desirably, the cloth may be densely woven in an octagonal three-dimensional weave. For providing additional thermal erosion protection for the cloth structure, tufts similar to those used on shag carpeting may be incorporated in the cloth. The tufts provide a sacrificial ablative action, thermally protecting the structural cloth. Nozzle surface radiation is prohibited by the refractory felt material that is sewn to the external surface of the structural cloth.

Although not illustrated, it will be understood that deployment of the foldable nozzle exit cone may be accomplished with mechanical telescoping actuators or with inflatable pneumatic structure in a manner known to those skilled in the art.

Other objects and advantages of the present invention will become apparent from the following detailed description when taken in conjunction with the accompanying drawings.

DESCRIPTION OF THE PREFERRED EMBODIMENTS

Figure 1:
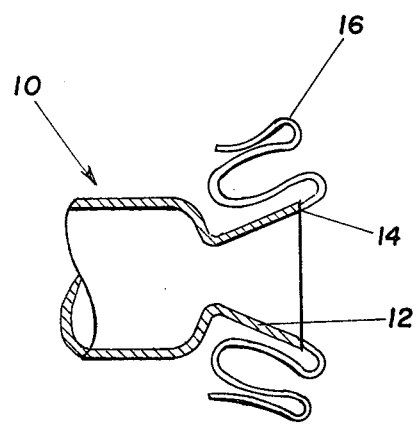
FIG. 1 is a fragmentary side elevational view in cross section showing the nozzle exit cone of the present invention in a retracted position about the main rocket nozzle.

There is illustrated in the fragmentary sectional view of FIG. 1 the aft portion 10 of a cylindrical rocket motor and the fixed portion 12 of a conventional convergent-divergent rocket engine nozzle. Attached to a peripheral portion, for example, a flange indicated at 14 at the outlet of the nozzle 12 is an extendible or expandable auxiliary nozzle portion or flared skirt 16 that is shown in a retracted or folded position. The skirt 16 is fitted at its forward end to the peripheral portion 14 of nozzle 12, being bolted or otherwise secured thereto.

Figure 2:
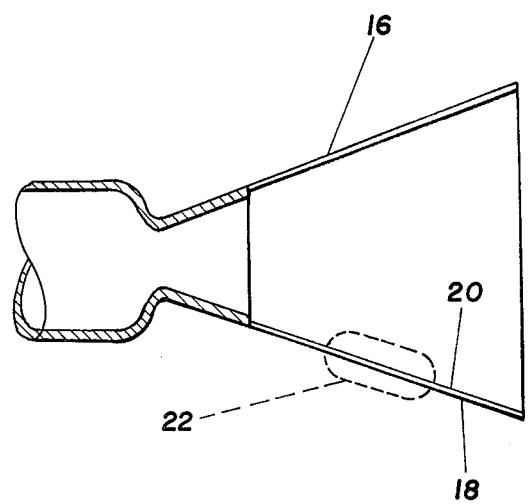
FIG. 2 is a fragmentary side elevational view in cross section showing the nozzle exit cone in an extended or fully deployed position.

As formed, and as indicated in its fully deployed position of FIG. 2, the nozzle portion or skirt 16 has the shape of the frustum of a cone. As seen in FIG. 1, the nozzle portion 16 is folded upon itself externally of the nozzle 12 in an inoperative, folded configuration. The nozzle portion 16 is sufficiently flexible so that it may be laid or extended in tucked-in condition over or closely adjacent to the external divergent surface of the nozzle 12. Deployment of the skirt 16 to the fully deployed position thereof shown in FIG. 2 may be accomplished in known manner. Since such deployment means are known in the art and form no part of the present invention, they will not be further described herein.

Figure 3:
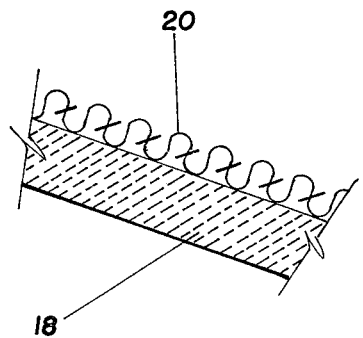
FIG. 3 is an enlarged view of a portion of the exit cone of FIG. 2.

Nozzle portion 16 is formed as a frustoconical skirt from a material which is collapsible and foldable and has the required refractory properties, combined with adequate flexibility, to facilitate its stowage in the retracted position of FIG. 1 and its deployment to the deployed position illustrated in FIG. 2. Specifically, the nozzle portion 16 is constructed, as indicated in FIG. 3, of a refractory felt 18 that is sewn to a densely woven refractory cloth 20. FIG. 3 is an enlarged view of the portion of the exit cone shown in FIG. 2 that is enclosed by dotted lines and is designated by the numeral 22.

The felt 18 is made in known manner by densely working together refractory fibers by pressure, heat, etc. without weaving or knitting.

The woven cloth 20 acts as a primary structure that transmits the thrust forces of the rocket engine 10 to the fixed nozzle 14. Multiple-plane weaving may be employed in making the woven cloth 20. Preferably, the cloth is densely woven of refractory fibers in an octagonal three-dimensional weave.

Figure 4:
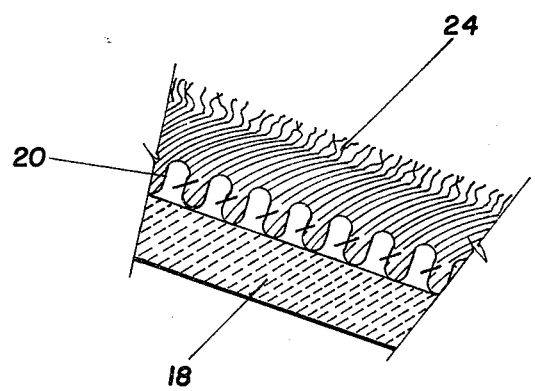
FIG. 4 is an enlarged view similar to that of FIG. 3 of a modification of the nozzle exit cone of the present invention wherein refractory tufts are incorporated in the cone to provide a sacrificial ablative action.

If additional thermal erosion protection is required for the refractory cloth structure 20, tufts, as indicated at 24 in FIG. 4, may be incorporated or anchored in the weave of the cloth structure 18 as by needle-punching or any other suitable attachment means. The tufts 24 act as a sacrificial ablative material, thereby thermally protecting the structural cloth.

Nozzle surface radiation is prohibited by the refractory felt material 18 that is sewn to the external surface of the cloth. The materials for the felt insulation 18, structural cloth 20, tufts 24 and the attachment yarn may be made of woven fibers or carbon, graphite, silica or quartz.

As those skilled in the art will understand, thermal advantages may be realized through variations in the length and density of packing of the structural material. In addition, thermal radiation may be reduced by decreasing the thermal conductivity of the felt insulation.

Thus, there has been provided in accordance with the invention an auxiliary rocket nozzle portion or exit cone that is flexible and is foldable upon itself over the rocket nozzle while in storage but which is extendible and when fully deployed extends aft of the nozzle as a flared skirt, the exit cone being made of a dense refractory felt sewn by a refractory yarn to the outer surface of a densely woven refractory cloth, the cloth being provided on the inner surface thereof, for additional thermal erosion protection, with an ablative material comprising tufts of refractory material that are incorporated in the woven cloth, nozzle surface radiation being prohibited by the refractory material sewn to the external surface of the structural cloth.

What is claimed is:

1. An auxiliary nozzle portion for a rocket motor having a combustion chamber provided with a rearwardly directed outlet and a rearwardly extending nozzle defining the outlet of the combustion chamber, comprising, a woven refractory cloth structure having an exterior surface and an interior surface and having the shape of a frustum of a cone, and a refractory felt sewn to the exterior surface of said cloth structure, said cloth structure being secured at the smaller end thereof to the rocket nozzle and being folded upon itself in an inoperative folded configuration, said cloth structure when deployed from said inoperative configuration to an operative configuration forming a frustoconical rearward extension of the rocket nozzle, said cloth structure being the primary supporting structure, when deployed, for transmitting the rocket motor thrust forces to the rocket nozzle, and said refractory felt providing thermal insulation for said structural cloth thereby to prevent thermal radiation from said auxiliary nozzle portion.

2. An auxiliary nozzle portion for a rocket motor as specified in claim 1 wherein said refractory felt is sewn to said refractory cloth structure with a refractory sewing yarn.

3. An auxiliary nozzle portion for a rocket motor as specified in claim 2 further including an ablative material on the interior surface of said cloth structure for providing protection against thermal erosion of said cloth structure.

4. An auxiliary nozzle portion for a rocket motor as specified in claim 3 wherein said ablative material comprises tufts of refractory material incorporated in said cloth structure.

5. An auxiliary nozzle portion for a rocket motor as specified in claim 4 wherein said tufts comprise densely packed refractory fibers anchored in said cloth structure.

6. An auxiliary nozzle portion for a rocket motor as specified in claim 4 wherein the materials for said structural cloth, tufts, felt insulation and attachment sewing yarn consist essentially of carbon, graphite, silica, glass or quartz.

7. An auxiliary nozzle portion for a rocket motor as specified in claim 4 wherein the material for said structural cloth, tufts, felt insulation and attachment sewing yarn is carbon.

8. An auxiliary nozzle portion for a rocket motor as specified in claim 4 wherein the material for said structural cloth, tufts, felt insulation and attachment sewing yarn is graphite.

9. An auxiliary nozzle portion for a rocket motor as specified in claim 4 wherein the material for said structural cloth, tufts, felt insulation and attachment sewing yarn is silica.

10. An auxiliary nozzle portion for a rocket motor as specified in claim 4 wherein the material for said structural cloth, tufts, felt insulation and attachment sewing yarn is glass.

11. An auxiliary nozzle portion for a rocket motor as specified in claim 4 wherein the material for said structural cloth, tufts, felt insulation and attachment sewing yarn is quartz.

12. An auxiliary nozzle portion for a rocket motor as specified in claim 2 wherein said cloth structure when in said inoperative condition is folded upon itself over the aft end of the rocket nozzle and extends over the rocket nozzle in tucked-in condition.

13. An auxiliary nozzle portion for a rocket motor as specified in claim 2 wherein said refractory cloth structure is woven in a multiple-plane weave united by a separate binding weft.

14. An auxiliary nozzle portion for a rocket motor as specified in claim 2 wherein said refractory cloth structure is woven in an octagonal 3-dimensional weave.

* * * * *